June 18, 1957  J. R. SELLS  2,796,266
WAGON CHASSIS
Filed June 15, 1956  2 Sheets-Sheet 1

INVENTOR.
JAMES R. SELLS,
BY
McMorrow, Berman & Davidson
ATTORNEYS

June 18, 1957   J. R. SELLS   2,796,266
WAGON CHASSIS
Filed June 15, 1956   2 Sheets-Sheet 2
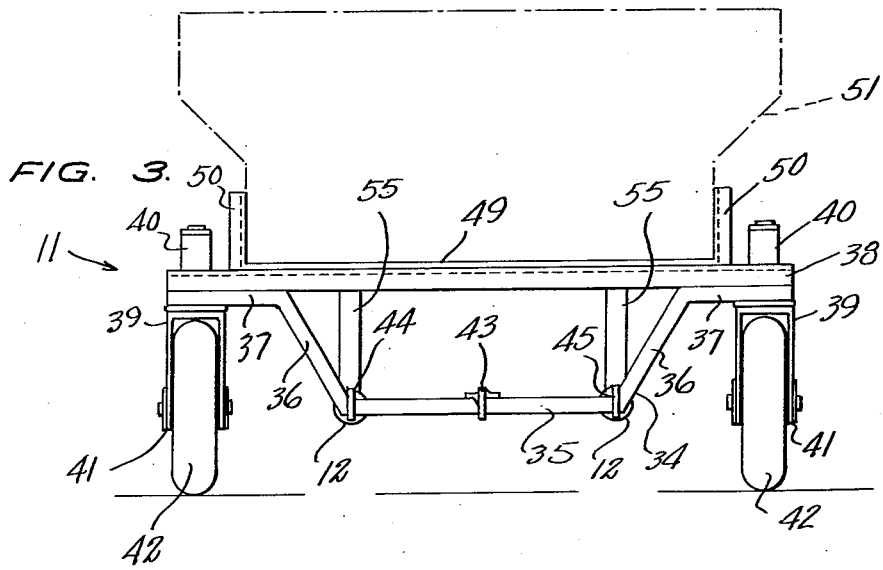
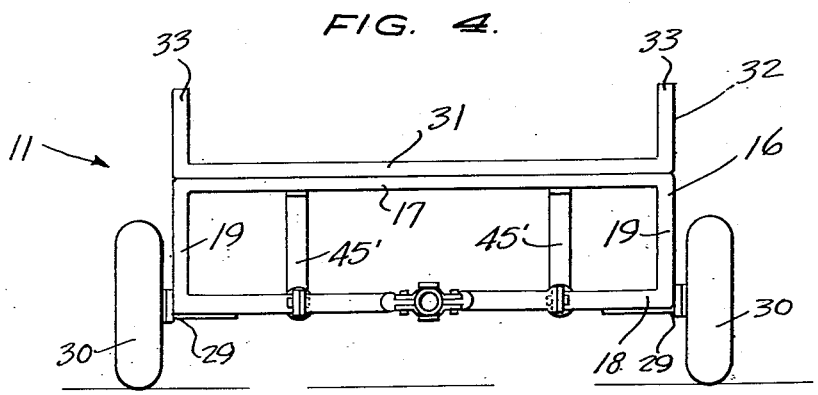
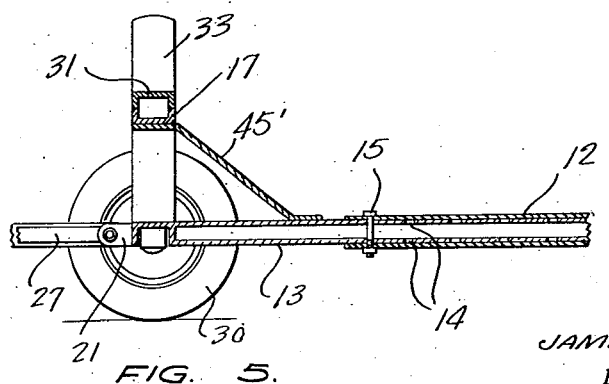
INVENTOR.
JAMES R. SELLS,
BY
McMorrow, Berman + Davidson
ATTORNEYS.

United States Patent Office 2,796,266
Patented June 18, 1957

2,796,266

WAGON CHASSIS

James R. Sells, New Hartford, Iowa

Application June 15, 1956, Serial No. 591,655

2 Claims. (Cl. 280—29)

This invention relates to vehicles, and more particularly to a wagon chassis adapted to be drawn behind a suitable tractor vehicle.

A main object of the invention is to provide a novel and improved wagon chassis which is simple in construction, which may be selectively connected at either end to the vehicle hauling same, and which turns easily regardless of which end thereof is connected to the tractor vehicle.

A further object of the invention is to provide an improved wagon chassis adapted to securely support a wagon body thereon and provided with means for attaching either end of the improved chassis to a tractor vehicle, as desired, the improved chassis being inexpensive to fabricate, being rugged in construction, and having a smooth turning action.

Further objects and advantages of the invention will become apparent from the following description and claims, and from the accompanying drawings, wherein:

Figure 3 is a rear end elevational view of the chassis of Figures 1 and 2.

Figure 4 is a front end elevational view of the chassis of Figures 1 and 2.

Figure 5 is a vertical cross sectional view taken on the line 5—5 of Figure 1.

Figures 1, 2:
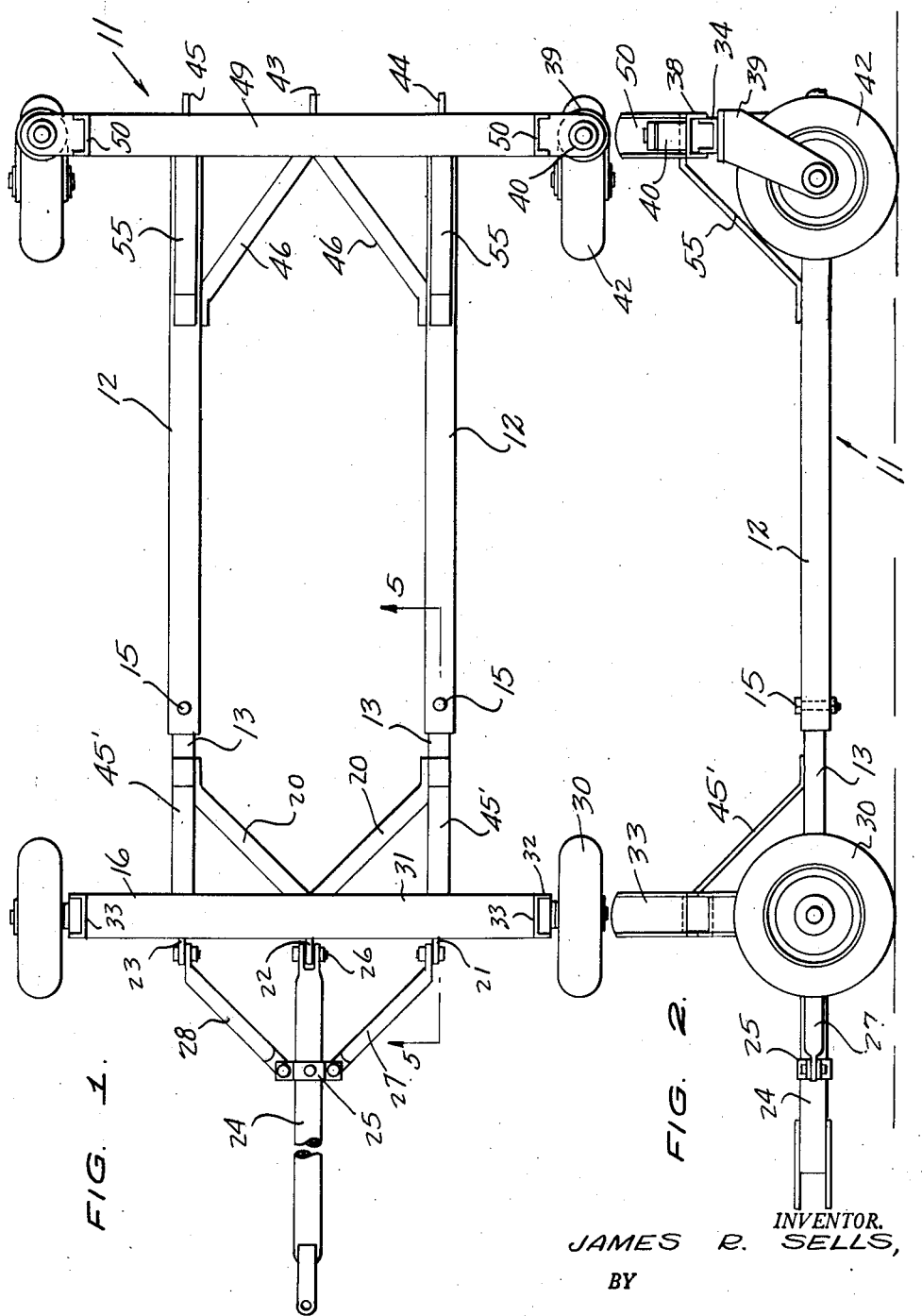
Figure 1 is a top plan view of a wagon chassis constructed in accordance with the present invention.
Figure 2 is a side elevational view of the chassis shown in Figure 1.

Referring to the drawings, the improved wagon chassis is designated generally at 11 and comprises a pair of longitudinal side members 12, 12 of tubular form which telescopically receive respective additional longitudinal members 13, 13 also of tubular form, as shown in Figure 5, the auxiliary longitudinal side members 13 being provided with spaced sets of vertically aligned apertures 14, 14 and the longitudinal members 12 being provided with registering apertures at their ends whereby fastening bolts 15 may be engaged through the apertures in the members 12 and through selected diametrically opposed apertures 14, 14 in the members 13 to secure the members 12 and 13 together in adjusted positions, as shown in Figure 5.

Designated at 16 is a transversely extending vertical rectangular frame having the top bar 17, the bottom bar 18, and the respective vertical end bars 19, 19. The bottom bar 18 is rigidly connected to the ends of the side members 13, 13, the frame 16 projecting substantial distances laterally beyond said side members 13, as is clearly shown in Figure 1. The bottom bar 18 is braced to the side members 13, 13 by the provision of a pair of diagonal struts 20, 20 rigidly connected between the intermediate portion of bottom bar 18 and the side members 13, 13, as shown in Figure 1.

Rigidly secured to the forward side of bottom bar 18 are the spaced apertured hitch lugs 21, 22 and 23, the central lug 22 being adapted to be pivotally secured to the end of a hitch bar 24, as shown in Figure 1, said hitch bar being provided with a transverse bracket 25 secured thereto forwardly of the pivot connection 26 to lug 22, the ends of said bracket 25 being connected to the lugs 21 and 23 by respective strut bars 27 and 28, as shown, whereby the hitch bar 24 is braced in a manner to maintain same in the central longitudinal vertical plane of the chassis while allowing the hitch bar 24 to angle around the transverse horizontal axis defined by the pivotal connections of the strut bars 27 and 28 with the lugs 21 and 23 and the pivotal connection of hitch bar 24 to the lug 22.

The frame 16 is provided at the opposite ends of the bottom bar 18 with respective axle members 29, 29 on which are journaled the respective road wheels 30, 30. Rigidly secured on the top bar 17 and coextensive therewith is the horizontal bight portion 31 of a U-shaped body positioning member 32, said positioning member having the respective vertical arms 33, 33 extending upwardly and being substantially in vertical alignment with the vertical end members 19, 19 of the rectangular frame 16, as is clearly shown in Figure 4.

Designated at 34 is a transversely extending, U-shaped cross member having the horizontal bight portion 35 which is rigidly secured at its ends to the rear ends of respective longitudinal side members 12, 12. The U-shaped cross member 34 has the upwardly and outwardly extending side arms 36, 36 which are formed at their top ends with the outwardly extending horizontal portions 37, 37. The U-shaped member 34 is preferably channel-shaped in cross section and is arranged with its flanges directed upwardly, as shown in Figure 2. Designated at 38 is a channel-shaped cross bar which overlies the member 34 and receives the flanges of said member 34 therein, being rigidly connected to said flanges at the horizontal portions 37, 37. Swivelly connected to the ends of the composite cross frame defined by the member 34 and the cross bar 38 are respective caster wheel assemblies 39, 39, said caster wheel assemblies having upper bearing portions 40, 40 located above the top surface of the cross bar 38 and having the wheel yoke elements 41, 41 disposed below the horizontal portions 37, 37 of member 34, the shaft of the caster assemblies extending vertically through the members 37 and the end portions of the cross bar 38. The caster assemblies 39 include the respective road wheels 42, 42 which are thus swivelly connected beneath the ends of the composite frame defined by members 34 and 38. Rigidly secured to the horizontal bight portion 35 of the U-shaped member 34 is the central apertured hitch lug 43 and the respective outer apertured hinge lugs 44 and 45 spaced in the same manner as the hitch lugs 21, 22 and 23 and being thus adapted to receive the hitch assembly comprising the hitch bar 24, the bracket 25 and the strut members 27 and 28 in the same manner as said hitch assembly is connected to the front cross frame 16.

The rear cross frame is braced to the side bars 12, 12 by inclined struts 55, 55 rigidly connecting the side bars 12, 12 to the end portions of the top cross bar 38, and by additional inclined struts 46, 46 rigidly connecting the side bars 12, 12 to the intermediate portion of the horizontal bight element 35 of the U-shaped cross member 34.

Inclined brace bars 45' are likewise provided, connecting the forward segments 13 of the side members to the bottom surface of the top bar 17 of the front cross frame, the strut bars 45' being in longitudinal vertical planes common with the longitudinal side bars, as are the inclined strut bars 55, 55.

It will thus be apparent that the frame is very rigid at its opposite sides and also in a horizontal plane, while at the same time the hitch structure may pivot freely around a transverse horizontal axis with respect to the chassis regardless of whether the hitch assembly is connected at the front end of the chassis, namely, adjacent the bottom bar 18 of the front transverse frame 16, or at the rear end of the chassis, namely, adjacent the bight element 35 of the U-shaped cross member 34.

Secured on the rear cross bar 38 is a cradle bar 49 extending over the major intermediate portion of the cross bar 38 and formed at its ends with the vertical upstanding arms 50, 50, defining stop post elements for receiving therebetween the lower portion of a truck body 51, shown in dotted view in Figure 3.

The cradle member 49 is thus substantially similar in structure to the front cradle member 32 secured on the top bar 17 of the transverse rectangular front cross frame 16.

As will be readily apparent, a truck body 51 may be thus positioned on the chassis and retained thereon by the upstanding vertical forward arms 33, 33 and the upstanding vertical rear arms 50, 50.

For roadway use, the tractor vehicle is preferably connected to the trailer chassis above described at the hitch lugs 43, 44 and 45, since this allows the end of the chassis 11 adjacent the cross bar 34 to turn freely without swaying and thus enables the chassis to travel on a roadway at substantial speed. For backing and for medium speed use, the chassis is preferably connected to the tractor vehicle at the forward hitch lugs 21, 22 and 23.

While a specific embodiment of an improved wagon chassis has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A wagon chassis comprising a pair of longitudinal side members, an upstanding vertical cross frame rigidly connecting the side members at one pair of ends thereof, a pair of road wheels journaled to the ends of said cross frame substantially at the lower portion thereof, a U-shaped cross member rigidly connecting the other ends of said side members, said U-shaped cross member having upwardly and outwardly extending side arms, horizontal, outwardly extending members at the top ends of said side arms, a cross bar rigidly connecting said top ends, respective caster wheel assemblies swivelly connected to said outwardly extending members, a hitch assembly, and means on the lower portion of said upstanding vertical cross frame and said U-shaped cross member for selectively connecting said hitch assembly thereto.

2. A wagon chassis comprising a pair of longitudinal side members, an upstanding vertical cross frame rigidly connecting the side members at one pair of ends thereof, a pair of road wheels journaled to the ends of said cross frame substantially at the lower portion thereof, a U-shaped cross member rigidly connecting the other ends of said side members, said U-shaped cross member having upwardly and outwardly extending side arms, horizontal, outwardly extending members at the top ends of said side arms, a cross bar rigidly connecting said top ends, respective caster wheel assemblies swivelly connected to said outwardly extending members, a hitch assembly, means on the lower portions of said upstanding vertical cross frame and said U-shaped cross member for selectively connecting said hitch assembly thereto, upstanding stop post elements rigidly secured on the ends of said last-named cross bar, and a U-shaped body-positioning member rigidly secured on the top portion of said upstanding vertical cross frame.

References Cited in the file of this patent

UNITED STATES PATENTS

| | | |
|---|---|---|
| 1,921,597 | Wolfe | Aug. 8, 1933 |
| 2,457,397 | Richards | Dec. 28, 1949 |